US006613840B2

(12) United States Patent
Itou et al.

(10) Patent No.: US 6,613,840 B2
(45) Date of Patent: Sep. 2, 2003

(54) RESIN COMPOSITION FOR POWDER COATING, POWDER COATING, AND COATED ARTICLE THEREWITH

(75) Inventors: Hiroyuki Itou, Osaka (JP); Tetsuro Agawa, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 54 days.

(21) Appl. No.: 10/013,709

(22) Filed: Dec. 13, 2001

(65) Prior Publication Data

US 2002/0114953 A1 Aug. 22, 2002

(30) Foreign Application Priority Data

Dec. 19, 2000 (JP) ...................................... P2000-385131

(51) Int. Cl.[7] ............................................. C09D 167/02
(52) U.S. Cl. ....................... 525/131; 525/438; 525/440; 525/934; 428/413; 428/423.1
(58) Field of Search ................................ 525/440, 131, 525/438, 934; 428/413, 423.1

(56) References Cited

U.S. PATENT DOCUMENTS

| 5,013,791 A | * | 5/1991 | Kerr ............................ 525/113 |
| 5,418,292 A | * | 5/1995 | Bode ............................ 525/131 |
| 5,439,988 A | | 8/1995 | Moens et al. |

FOREIGN PATENT DOCUMENTS

| DE | 43 06 102 | | 9/1994 |
| EP | 0521992 | * | 6/1996 |
| EP | 0 985 694 | | 3/2000 |

* cited by examiner

*Primary Examiner*—Patricia A. Short
(74) *Attorney, Agent, or Firm*—Armstrong, Westerman & Hattori, LLP

(57) ABSTRACT

A resin composition for a powder coating, which comprises a non-crystalline polyester resin (A) having a carboxyl group, a crystalline polyester polyurethane resin (B) and a curing agent (C) made of a compound having a functional group reactable with the carboxyl group as an essential component, yields a powder coating which is highly suitable for practical use, the powder coating having superior storage stability (blocking resistance) and forming a coating film having superior smoothness under low temperature curing conditions.

11 Claims, No Drawings

RESIN COMPOSITION FOR POWDER COATING, POWDER COATING, AND COATED ARTICLE THEREWITH

BACKGROUND OF THE INVENTION

1. Field of the Invention

The present invention relates to a novel and useful resin composition for a powder coating, to a powder coating, and to a coated article therewith. More specifically, the present invention relates to a resin composition for a powder coating which is highly suitable for practical use, comprising a non-crystalline polyester resin having carboxyl groups, a crystalline polyester polyurethane resin, and a curing agent thereof as an essential film-forming component, the resin composition yielding a powder coating which has superior storage stability (blocking resistance) and forms a coating film having superior smoothness and superior curability at low temperatures as well as having characteristics such as impact resistance (hereinafter referred to as mechanical properties) and processability and weatherability at the same time, and relates to a powder coating and to a coated article therewith.

2. Description of Related Art

In view of environmental problems such as air pollution, the powder coatings have recently become more common coatings containing no organic solvent because the powder coatings are less polluting. Although the powder coating has been widely used for various purposes, including coating of metal products in the fields of household electric appliances and building materials, the use as materials having low heat resistance such as coating agents for plastics and lumber has been studied because of the characteristic of the powder coating compositions that the solvents do not substantially evaporate during the application.

As a powder coating which is now being put to practical use, for example, polyester, epoxy and acrylic powder coatings have generally been known. Among these powder coatings, a polyester powder coating, especially a polyester powder coating comprising a combination of a non-crystalline polyester resin having a hydroxyl group or a carboxyl group and a curing agent has been widely used for the purposes which require such characteristics, for example, household electric appliances and building materials, because such a polyester powder coating has good balanced performance as a coating film and imparts good appearance and pliability to the coating film.

However, the above polyester powder coating comprising the non-crystalline polyester and the curing agent is suited for use in the field of household electric appliances which require good appearance and pliability of the coating film because of comparatively high molecular weight and high viscosity in a melted state, but is not suited for use in plastics, coating agents for lumber and vehicles which require smoothness of the coating film and curability at low temperatures because they are inferior in these performances.

Therefore, as a method of improving the smoothness of the surface of the coating film of the polyester powder coating, there have been proposed a method of lowering the viscosity in a melted state by reducing the average molecular weight of a polyester resin as a main component of the coating and a method of lowering the glass transition temperature by copolymerizing a component capable of imparting the flexibility.

However, these methods have a problem in that the storage stability (blocking resistance) of the coating is reduced, although the smoothness of the surface of the coating film is improved by reducing the softening point or glass transition temperature of the polyester resin.

Methods of improving curability at low temperatures includes a method of adding a curing catalyst. In this case, the smoothness of the coating film is inferior, although the curability at low temperatures is improved.

Although Japanese Unexamined Patent Application, First Publication No. 59-25841 discloses a technique about a composition for a powder coating, which suggests the use of a polyester polyurethane resin in combination with a polyester resin, a powder coating, using them in combination is not actually described. Moreover, the polyester polyurethane resin used alone is non-crystalline and, even if the polyester polyurethane is used in combination with the polyester resin, the resulting composition for powder coating, is inferior in storage stability.

BRIEF SUMMARY OF THE INVENTION

Objects of the present invention is to provide a resin composition for a powder coating which is highly suitable for practical use, the resin composition yielding a powder coating which has superior storage stability (blocking resistance) and forms a coating film having superior curability at low temperatures and superior smoothness, and to provide a powder coating and a coated article therewith.

To overcome various drawbacks and problems in the conventional art described above, the present inventors have intensively researched in view of the objects to be achieved by the present invention, and the present inventors have found that a resin composition for a powder coating, comprising a non-crystalline polyester resin having a carboxyl group, a crystalline polyester polyurethane resin, and a curing agent as an essential film-forming component has excellent smoothness of the coating film under curing conditions at low temperatures and has excellent storage stability (blocking resistance) of the coating and yields a powder coating which is highly suitable for practical use. Thus, the present invention has been completed.

The present invention provides a resin composition for powder coating, comprising a non-crystalline polyester resin (A) having a carboxyl group, a crystalline polyester polyurethane resin (B) and a curing agent (C) made of a compound having a functional group reactable with the carboxyl group as an essential component. The present invention also provides a powder coating comprising the resin composition for powder coating and a surface modifier. The present inventions also provides a coated article obtained by coating a substrate with the powder coating and curing the coating film with heat.

The resin composition for powder coating and the powder coating of the present invention are useful for the purposes such as automobile bodies, building materials, plastic products, and woodworking products because they are superior in storage stability (blocking resistance) of the coating and mechanical properties of the coating film while maintaining the weatherability of the coating film and are also superior in performances of the coating film, such as appearance (smoothness) of the coating film, boiling water resistance, moisture resistance, and corrosion resistance. The coated article of the present invention is superior in weatherability, mechanical properties, appearance (smoothness), boiling water resistance, moisture resistance, and corrosion resistance.

DETAILED DESCRIPTION OF THE INVENTION

The present invention will now be described in detail.

The non-crystalline polyester resin (A) having a carboxyl group used in the present invention (hereinafter referred to as a non-crystalline polyester resin (A)) is not specifically limited as long as it has a carboxy group in a molecule and is non-crystalline.

The term "non-crystalline" refers to the fact that a crystallization peak temperature is not exhibited in a differential scanning calorimetry (DSC) curve obtained in accordance with the conditions defined in JIS K7121.

Examples of the polyhydric carboxylic acid unit constituting the non-crystalline polyester resin (A) include terephthalic acid, isophthalic acid (including isophthalic acid wherein a hydrogen atom of the aromatic ring is substituted with an alkyl group, such as 4-methylisophthalic acid or 4-tertiary butylisophthalic acid) and an anhydride thereof, adipic acid, sebacic acid, succinic acid, maleic acid, fumaric acid, tetrahydrophthalic acid, hexahydrophthalaic acid and anhydrides thereof.

Among these polyhydric carboxylic acid units, isophthalic acid accounts for 50 mol % or more, and preferably for 70 mol % or more of the polyhydric carboxylic unit, because the coating film having excellent weatherability and smoothness can be obtained.

In the polyester powder coating, terephthalic acid as a main component has conventionally been used in the resin component to improve the storage stability (blocking resistance) and mechanical properties of the coating. As a result, there arises a problem in that the weatherability is not sufficient. By using 50 mol % or more of isophthalic acid as the polycarboxylic acid component, a coating film having excellent weatherability can be obtained.

Typical examples of the polyhydric alcohol unit constituting the non-crystalline polyester resin (A) include ethylene glycol, propylene glycol, 1,3-butanediol, 1,4-butandiol, 1,6-hexanediol, neopentyl glycol, trimethylolethane, trimethylolpropane, glycerin, and pentaerythritol.

The acid value of the non-crystalline polyester resin (A) is preferably within a range from 5 to 100 in view of the mechanical strength, and is particularly preferably from 10 to 70. By using those having an acid value of 5 or more, the crosslink density is enhanced and the mechanical strength is increased.

As used herein, the term "acid value" refers to the number of mg of potassium hydroxide required to neutralize an acid group in 1 g of the resin.

The softening point of the non-crystalline polyester resin (A) is not specifically limited, but is preferably within a range from 80 to 150° C., and more preferably from 100 to 120° C., in view of the blocking resistance and smoothness of the coating film. When the softening point of the resin is within the above range, the blocking resistance is high and the smoothness of the coating film is excellent.

The number-average molecular weight of the non-crystalline polyester resin (A) is not specifically limited, but is preferably within a range from 1,000 to 10,000, and particularly preferably from 2,000 to 6,000. When the number-average molecular weight of the resin is within the above range, the storage stability of the powder coating is excellent and the smoothness of the coating film is excellent.

The non-crystalline polyester resin (A) can be prepared by a conventionally known reaction method such as an esterification reaction or a transesterification reaction.

That is, it can be prepared by a dehydration condensation reaction between a polyhydric carboxylic acid and a polyhydric alcohol under heating conditions. In this case, the non-crystalline polyester resin (A) can be obtained by appropriately controlling the polyhydric carboxylic acid and the polyhydric alcohol, and the cooling rate after converting into a resin.

The method of introducing a carboxyl group into the non-crystalline polyester resin (A) is not specifically limited, but examples thereof include a method of reacting the polyhydric carboxylic acid and the polyhydric alcohol at an excess equivalent ratio of a carboxyl group based on a hydroxyl group and a method of the ring-opening addition reaction of an anhydride of a polyhydric carboxylic acid.

The crystalline polyester polyurethane resin (B) used in the present invention (hereinafter referred to as a crystalline polyurethane resin (B)) is not specifically limited as long as it is a polyester polyurethane resin which exhibits crystallinity.

The term "crystalline" refers to the fact that a crystallization peak temperature is exhibited in a differential scanning calorimetry (DSC) curve obtained in accordance with the conditions defined in JIS K7121.

The crystallization peak temperature of the crystalline polyurethane resin (B) is preferably within a range from 30 to 150° C., and particularly preferably from 50 to 130° C. When the crystallization peak temperature of the resin is within a range from 30 to 150° C., the powder coating is superior in storage stability and melt-kneading in the preparation of a coating is easily carried out. Therefore, it is preferred.

The crystallization peak temperature is based on a numerical value determined by the peak temperature of a differential scanning calorimetry (DSC) curve described in JIS K7121: Method for Measurement of Transition Temperature of Plastic.

The melt viscosity at 180° C. of the crystalline polyurethane resin (B) is preferably 10 Pa·s or less, and particularly preferably from 0.005 to 1 Pa·s, in order to obtain low viscosity at a curing temperature and good smoothness.

The crystalline polyurethane resin (B) may have a carboxyl group and/or a hydroxyl group. The crystalline polyurethane resin (B) having a carboxyl group is particularly preferred because it reacts with a curing agent (C) described hereinafter, which is made of a compound having a functional group reactable with the carboxyl group to form a cured coating film having excellent performances of the coating film. In the case in which the crystalline polyurethane resin (B) has a hydroxyl group, a curing agent made of a compound having a functional group reactable with the hydroxyl group is preferably used in combination with the curing agent (C).

The acid value and hydroxyl value of the crystalline polyurethane resin (B) are not specifically limited, but the acid value is preferably within a range from 10 to 200 in the case in which the resin has an acid group as a main terminal group, while the hydroxyl value is preferably within a range from 10 to 200 in the case in which the resin has a hydroxyl group as a main terminal group.

The term "hydroxyl value" refers to the number of mg of potassium hydroxide required to neutralize an acid capable of bonding in the case in which a hydroxyl group 1 g of the resin is acetylated.

The crystalline polyurethane resin (B) may have a functional group such as an isocyanate group, silyl group, or acid anhydride group, in addition to the carboxyl group and/or the hydroxyl group.

Examples of the polyesterpolyol unit of the crystalline polyurethane resin (B) include those obtained by esterificating a polyhydric carboxylic acid and a polyhydric polyol by a conventional method. The number-average molecular weight of the polyesterpolyol is not specifically limited, but is preferably within a range from 500 to 10,000.

Typical examples of the polycarboxylic acid unit include aliphatic dibasic acids such as oxalic acid, adipic acid, azelaic acid, sebacic acid, dodecane diacid, and eicosane diacid; aromatic dicarboxylic acids such as terephthalic acid, isophthalic acid, phthalic acid, and 2,6-naphthalenedicarboxylic acid; alicyclic dicarboxylic acids such as 1,4-cyclohexanedicarboxylic acid, 1,3-cyclohexanedicarboxylic acid, hexahydrophthalic anhydride, and tetrahydrophthalic anhydride; and unsaturated dicarboxylic acids such as maleic acid, fumaric acid, and itaconic acid. Also a trifunctional or polyfunctional carboxylic acid such as trimelltic acid or pyromellitic acid, and a hydroxycarboxylic acid such as p-oxybenzoic acid or tartaric acid can be used in combination. Among these dicarboxylic acids, straight-chain aliphatic dicarboxylic acids having an even number from 2 to 20 carbon atoms are preferred in order to reduce the melt viscosity and to control the crystallization peak temperature of the crystalline polyurethane. Among these dicarboxylic acids, those having 12 carbon atoms or fewer are particularly preferred.

Typical examples of the polyol unit include ethylene glycol, 1,3-propylene glycol, 1,2-propylene glycol, 2-methyl-1,3-propylene glycol, 1,4-butylene glycol, 1,3-butylene glycol, 1,6-hexanediol, diethylene glycol, dipropylene glycol, neopentyl glycol, triethylene glycol, 1,4-cyclohexanediol, ethylene oxide adduct of bisphenol A, propylene oxide adduct of bisphenol A, cyclohexanedimethanol, hydrogenated bisphenol A, ethylene oxide adduct of hydrogenated bisphenol A, propylene oxide adduct of hydrogenated bisphenol A, glycerin, trimethylolpropane, trishydroxymethylaminoethane, pentaerythritol, dipentaerythritol, and sorbitol. Among these polyol units, straight-chain aliphatic dicarboxylic acids having an even number from 2 to 22 carbon atoms are preferred in order to reduce the melt viscosity and to control the crystallization peak temperature of the crystalline polyurethane.

Typical examples of the polyisocyanate unit include polymethylenepolyphenyl isocyanate, diphenylmethane diisocyanate, tolylene diisocyanate, xylene diisocyanate, triphenylmethane triisocyanate, or hydrogenated compounds thereof, and tetramethylene diisocyanate, hexamethylene diisocyanate, trimethylhexamethylene diisocyanate, isophorone diisocyanate, and lysine diisocyanate. Also reaction products of these diisocyanates and a difunctional or polyfunctional polyol, and isocyanurate compounds of these diisocyanates can be used. Among these polyisocyanate units, diisocyanate is preferred in view of low viscosity and crystallization degree, and hexamethylene diisocyanate is particularly preferred.

The reaction between the polyisocyanate and the polyesterpolyol is carried out at a temperature within a range from 100 to 200° C. where melt flow of the polyesterpolyol occurs, and is usually carried out so that the ratio of the hydroxyl group is excessive based on the isocyanate group in the polyisocyanate. In that case, a reaction catalyst such as a tin compound can also be used. In the prepolymer method described hereinafter, chain extenders can also be used in order to control the crystallinity of a polyurethane resin by improving the concentration of a urethane bond in the polyurethane resin.

The crystalline polyurethane resin (B) used in the present invention can be prepared by a conventionally known reaction method such as the so-called one-shot method or the prepolymer method.

The crystalline polyurethane resin (B) can be obtained by reacting the polyesterpolyol with the polyisocyanate, or reacting the polyesterpolyol with the polyisocyanate to form a urethane prepolymer having a terminal isocyanate group and reacting the resulting urethane prepolymer with a chain extender such as an amine compound. In this case, a crystalline polyurethane resin can be obtained by appropriately controlling the presence or absence of the polyesterpolyol, the polyisocyanate and the chain extender, and by controlling the cooling rate after forming the resin.

Typical examples of the chain extender include polyols such as ethylene glycol and 1,4-butanediol; polyethers such as polytetramethylene glycol; and diamines such as hexamethylenediamine.

Introduction of a carboxyl group into the crystalline polyurethane resin (B) can be carried out by using a method allowing a carboxyl group to remain in the preparation of a polyesterpolyol using a carboxyl group-containing polyhydric alcohol as a polyhydric alcohol, a method of esterifying a hydroxyl group remaining in a polyurethane resin after the completion of the urethanation reaction with a polyhydric carboxylic acid, or a method of effecting a ring-opening reaction between the remaining hydroxyl group and a carboxylic anhydride.

A ratio of the non-crystalline polyester resin (A) to the crystalline polyurethane resin (B), (A)/(B), is not specifically limited, but is preferably within a range from 97/3 to 60/40, and particularly preferably from 90/10 to 70/30, in terms of weight.

When the ratio of the non-crystalline polyester resin (A) to the crystalline polyurethane resin (B) is within the range described above, the storage stability (blocking resistance) is good and also the smoothness, mechanical properties and weatherability of the coating film are excellent. Therefore, it is preferred.

The curing agent (C) made of a compound having a group reactable with a carboxyl group used in the present invention {hereinafter referred to as a curing agent (C)} is not specifically limited as long as it is a compound capable of curing a resin by reacting with a carboxyl group in a non-crystalline polyester resin (A) (or in a crystalline polyurethane resin in some cases).

Examples of the compound having a functional group reactable with a carboxyl group include compounds having a reactive group such as a glycidyl group (epoxy group), hydroxyl group, or amino group. Examples of the compound having a functional group reactable with a carboxyl group include acrylic resin having a glycidyl group, polyester resin having a glycidyl group, polyether resin having a glycidyl group, polyamide resin having a glycidyl group, polyolefin resin having a glycidyl group, or polyvinyl acetate resin having a glycidyl group; diglycidyl ether type epoxy resin, novolak type epoxy resin, or dicyclopentadiene-modified type epoxy resin, which is made from a material such as bisphenol A, bisphenol F, bisphenol S, or biphenyl; compound having a glycidyl group, such as triglycidyl isocyanurate, glycidyl (meth)acrylate, or neopentyl glycol diglycidyl ether; hydroxyl group-containing compound such as β-hydroxyalkylamide, ethylene glycol, propylene glycol, or hexamethylene glycol; and amine compound such as tetramethylenediamine or hexamethylenediamine. Among these compounds, the use of a glycidyl group-containing acrylic resin, β-hydroxyalkylamide, triglycidyl isocyanurate and a diglycidyl ether type epoxy resin of bisphenol A is preferred in view of the smoothness, processability and curability at low temperatures of the coating film. Among these compounds, the β-hydroxyalkylamide and glycidyl group-containing acrylic resin are particularly preferred.

Examples of most preferred β-hydroxyalkylamide used as the curing agent include "Primid XL-552" (manufactured by EMS-CHEMIE in Switzerland).

Next, the glycidyl group-containing acrylic resin as one of preferably used curing agents (C) will be described.

The softening point of the glycidyl group-containing acrylic resin is within a range from 50 to 130° C., and is preferably from 90 to 120° C. When the softening point is within the above range, the storage stability (blocking resistance) of the resulting powder coating is good and the smoothness of the coating film is excellent The number-average molecular weight of the glycidyl group-containing acrylic resin is within a range from 300 to 10,000, and preferably from 1,000 to 5,000. When the number-average molecular weight is within the above range, the coating film is superior in mechanical properties and smoothness. Therefore, it is preferred.

The method of preparing the glycidyl group-containing acrylic resin includes, for example, a method of the radical polymerization reaction of a glycidyl group-containing monomer such as glycidyl (meth)acrylate or cyclohexylmethyl (meth)acrylate and, if necessary, the other vinyl monomers by a conventionally known polymerization method such as solution polymerization, bulk polymerization, or suspension polymerization.

Examples of the other vinyl monomers include hydroxyl group-containing monomers such as hydroxyl (meth)acrylate; carboxyl group-containing monomers such as (meth)acrylic acid; (meth)acrylates such as methyl (meth)acrylate, ethyl (meth)acrylate, butyl (meth)acrylate, and 2-ethylhexyl (meth)acrylate; aromatic vinyl compounds such as styrene and a-methylstyrene; (meth)acrylonitriles; amino group-containing monomers such as dimethylaminoethyl (meth)acrylate; and vinyl monomers of carboxylic acid, such as vinyl acetate.

The content of the glycidyl group-containing monomer in the glycidyl group-containing acrylic resin is preferably within a range from 20 to 100% by weight, and particularly preferably from about 30 to 60% by weight, in view of the reactivity.

In the case in which the crystalline polyurethane resin (B) has a hydroxyl group, when using a compound having a group reactable with a hydroxyl group, a coating film having higher curability can be obtained.

Examples of the compound having a group reactable with a hydroxyl group include block polyisocyanate compound, isophorone compound blocked with ε-caprolactam ("Bestagon B-1530" (manufactured by Degussa)), or block isocyanurate blocked internally with a urethodione bond ("Bestagon BF-1540" (manufactured by Degussa)); and polyhydric carboxyl group-containing compound.

With respect to the content of the curing agent (C), a ratio of a functional group of the curing agent (C) to a carboxyl group of the non-crystalline polyester resin (A) (sum total of a carboxyl group of the non-crystalline polyester resin (A) and a carboxyl group of the crystalline polyurethane resin (B) in the case in which the crystalline polyurethane resin (B) has a carboxyl group), ((A)/(C)), is within a range from 1.3/1.0 to 1.0/1.3.

When using the curing agent (C) in combination with the compound having a group reactable with a hydroxyl group, an equivalent ratio of a functional group such as an isocyanate group to a hydroxyl group of the crystalline polyurethane resin (B) is within a range from 0.5/1.0 to 1.5/1.0, and preferably from 0.8/1.0 to 1.2/1.0.

The powder coating using a resin composition for the powder coating of the present invention can be widely used for various purposes such as household electric appliances, building materials, and materials having low heat resistance because of the feature that it has good storage stability (blocking resistance) and has excellent mechanical properties while maintaining weatherability, and is also superior in appearance (smoothness), boiling water resistance, moisture resistance, and corrosion resistance.

Next, the powder coating will be described in detail.

To prepare a powder coating of the present invention using the resulting resin composition for powder coating, various conventionally known methods can be directly employed.

Although surface modifiers such as leveling agent and anti-bubbling agent are generally added to the resin composition for powder coating, additives such as curing agents, which are different from those in the above resin composition, epoxy resins, pigments and curing accelerators can be appropriately added, if necessary.

The powder coating of the present invention can be prepared from the resin composition for powder coating and additives described above by a conventionally known method.

Examples of the conventionally known method include a method of mixing the resin composition for powder coating with the additives, melt-kneading the mixture and grinding the resulting solid coating and a method of preparing using a so-called mechanical grinding system. Although other methods can also be used, the methods described above are preferred because of simplicity and ease of execution.

The powder coating of the present invention can be applied, for example, as coatings for automobile bodies and parts for automobiles; two-wheeled vehicles and parts for two-wheeled vehicles; various building materials such as gates and fences; various materials for building interiors and exteriors, such as aluminum sashes; materials of iron or non-iron metals, such as aluminum wheels; and plastic products, and various woodworking products, because it is superior in storage stability (blocking resistance) and imparts high smoothness to the coating film under low temperature curing conditions.

Next, the coated article obtained by using the powder coating of the present invention will be described.

The coated article of the present invention is composed of a cured coating film formed by coating a substrate with the powder coating thus obtained by various conventionally known methods and curing by heating (baking), and the substrate.

Examples of the method of coating the substrate with the powder coating include the electrostatic powder coating method, the frictional electrification method, and the fluidizing coating method.

The thickness of the coating film is not specifically limited, but is preferably within a range from about 30 to 150 μm, and particularly preferably from about 50 to 100 μm.

The coating film is preferably cured by heating (baking) in a drying oven at 140 to 210° C. for about 20 to 60 minutes.

Typical examples of the substrate include various metal materials or metal products such as aluminum, stainless steel, chromium plating, galvanized iron sheets, and tin plates; roofing tiles; glasses; various inorganic building materials; heat-resistant plastics; and lumber. Specific examples thereof include automobile bodies and parts for automobiles; two-wheeled vehicles and parts for two-wheeled vehicles; various building materials such as gates and fences; various materials for building interiors and exteriors, such as aluminum sashes; materials of iron or non-iron metals, such as aluminum wheels; and plastic products and various woodworking products. Those subjected to surface treatments such as chemical treatment, zinc phosphating treatment and chromate treatment, and those subjected to electrodeposition coating are also included.

EXAMPLES

The following Reference Examples, Examples, and Comparative Examples further illustrate the present invention in detail; however, the present invention is not limited to these Examples. In the following Examples, parts and percentages are by weight unless otherwise specified. Characteristic values of the Reference Examples were measured or evaluated by the following methods.

Hydroxyl value: A crystalline urethane resin sample was dissolved in a mixed solution of acetic anhydride and pyridine and heated at reflux at 100° C. for one hour, thereby acetylating hydroxyl groups, and deionized water was added, followed by heating to reflux, and then cooling. Then, the hydroxyl value was determined by back titration with a toluene/methanol solution of potassium hydroxide (unit: mg KOH/g).

Acid value: A crystalline resin sample was dissolved in cyclohexanone, and then the acid value was determined by titration with a methanol solution of potassium hydroxide (unit: mg KOH/g).

Softening point: Using a ring and ball softening point measuring device (manufactured by Meihosha Factory Ltd.), a sample was heated in a heating bath of glycerin at a heating rate of 3° C./min, and then the temperature at which the sample began to melt and a ball drops was measured (unit: ° C.).

Crystallization peak temperature: Measured by using a DSC-3100 type scanning calorimetry (DSC) (manufactured by MAC Science Co., Ltd.) in accordance with JIS K7121 (unit: ° C.)

Melt viscosity: Using a cone plate type viscometer CV-1S (manufactured by Toa Industry Co., Ltd.), the rotation speed of cone CP-5 was set at 750 rpm. The melt viscosity was measured at a plate temperature of 180° C. (unit: Pa·s)

Reference Example 1

(Preparation of Non-Crystalline Polyester Resin (A) Having a Carboxyl Group)

In a reaction vessel equipped with a stirrer, a thermometer, a rectifying column, and a nitrogen introducing inlet, 410 parts of neopentyl glycol, 10 parts of trimethylolpropane, 700 parts of isophthalic acid and 0.5 parts of dibutyltin oxide were charged and were then heated to 240° C. over 5 hours while stirring in a nitrogen atmosphere. The dehydration condensation reaction was continued at 240° C. to obtain a polyester resin having an acid value of 35 and a softening point of 110° C. The resulting polyester resin is abbreviated to "polyester resin (A-1)" hereinafter.

Reference Example 2

Preparation of Crystalline Polyester Polyurethane Resin (B)

In a reaction vessel equipped with a stirrer, a thermometer, a rectifying column, and a nitrogen introducing inlet, 560 parts of 1,4-butanediol, 535.4 parts of succinic anhydride and 0.5 parts of dibutyltin oxide were charged and were then heated to 240° C. while stirring in a nitrogen atmosphere. The dehydration condensation reaction was carried out to obtain a polyesterpolyol having a hydroxyl value of 100 and an acid value of 3. While being maintained at 150° C., 120 parts of hexamethylene diisocyanate was added over 2 hours. Furthermore, 34 parts of succinic anhydride was added and the ring-opening reaction was carried out to obtain a crystalline polyester polyurethane resin having an acid group, which has a hydroxyl value of 1, an acid value of 20, a melt viscosity of 0.6 Pa·s and a crystallization peak temperature of 79° C. The resulting crystalline polyester polyurethane resin is abbreviated to "polyester polyurethane resin (B-1)" hereinafter.

Reference Example 3

Preparation of Another Crystalline Polyester Polyurethane Resin (B)

In a reaction vessel equipped with a stirrer, a thermometer, a rectifying column, and a nitrogen introducing inlet, 469 parts of ethylene glycol, 668 parts of succinic anhydride and 0.5 parts of dibutyltin oxide were charged and were then heated to 240° C. while stirring in a nitrogen atmosphere. The dehydration condensation reaction was carried out to obtain a polyesterpolyol having a hydroxyl value of 92.5 and an acid value of 11.1. While being maintained at 150° C., 88 parts of hexamethylene diisocyanate was added over 2 hours. The crystalline polyester polyurethane resin had an acid group, which has a hydroxyl value of 31, an acid value of 10, a melt viscosity of 0.3 Pa·s, and a crystallization peak temperature of 59° C. The resulting crystalline polyester polyurethane resin is abbreviated to "polyester polyurethane resin (B-2)" hereinafter.

Reference Example 4

Preparation of Non-Crystalline Polyester Polyurethane Resin

In a reaction vessel equipped with a stirrer, a thermometer, a rectifying column, and a nitrogen introducing inlet, 700 parts of isophthalic acid, 465 parts of 2-methyl-1,3-propanediol and 0.5 parts of dibutyltin oxide were charged and were then heated to 240° C. while stirring in a nitrogen atmosphere. The dehydration condensation reaction was carried out to obtain a polyesterpolyol having a hydroxyl value of 70 and an acid value of 4.3. While being maintained at 150° C., 71 parts of isophorone diisocyanate was added over 2 hours. Furthermore, 90 parts of hexahydrophthalic anhydride was added and the ring-opening reaction was carried out to obtain a non-crystalline polyester polyurethane resin having an acid group, which has a hydroxyl value of 1.0, an acid value of 33.2, and a melt viscosity of 0.2 Pa·s. The resulting crystalline polyester polyurethane resin is abbreviated to "polyester polyurethane resin (B-3)" hereinafter.

Examples 1 to 4 and Comparative Examples 1 to 3 Preparation of Resin Composition for Powder Coating, and Powder Coating According to the formulations shown in Table 1 and Table 2, resin compositions for powder coatings were prepared. Each of these compositions was melt-kneaded at 100° C. using "Co-kneader PR-46" (single screw extruder, manufactured by Buss in Switzerland), ground, and then classified using a 200 mesh wire gauze to prepare each powder coating having an average particle size within a range from 30 to 40 um. The resulting powder coatings are abbreviated to (P-1) to (P-4) and (p-1) to (p-3).

TABLE 1

| | | Examples | | | |
|---|---|---|---|---|---|
| Items | | 1 | 2 | 3 | 4 |
| Non-crystalline polyester resin A-1 | | 85 | 68 | 88 | 66 |
| Crystalline polyester | B-1 | 10 | 8 | | |
| polyurethane resin | B-2 | | | 6 | 10 |
| Primid XL-552 | | 5 | | 5 | |
| Finedic A-261 | | | 24 | | 22 |
| Bestagon B-1530 | | | | 1 | 2 |
| Epiclon 4050 | | 3 | 3 | 3 | 3 |
| Acronal 4F | | 0.5 | 0.5 | 0.5 | 0.5 |
| Benzoin | | 0.5 | 0.5 | 0.5 | 0.5 |
| CR-90 | | 50 | 50 | 50 | 50 |
| Name of powder coating | | P-1 | P-2 | P-3 | P-4 |

TABLE 2

| | | Comp. Examples | | |
|---|---|---|---|---|
| Items | | 1 | 2 | 3 |
| Non-crystalline polyester resin A-1 | A-1 | 95 | 85 | 68 |
| Crystalline polyester | B-3 | | 10 | 8 |
| polyurethane resin | | | | |
| Primid XL-552 | | 5 | 5 | |
| Finedic A-261 | | | | 24 |
| Epiclon 4050 | | 3 | 3 | 3 |
| Acronal 4F | | 0.5 | 0.5 | 0.5 |
| Benzoin | | 0.5 | 0.5 | 0.5 |
| CR-90 | | 50 | 50 | 50 |
| Name of powder coating | | p-1 | p-2 | p-3 |

Notes for Table 1 and Table 2:
1) Primid XL-552: β-hydroxyalkylamide manufactured by EMS-CHEMIE in Switzerland
2) Finedic A-261: glycidyl group-containing solid acrylic resin (epoxy equivalent: 500) manufactured by DAINIPPON INK & CHEMICALS, Inc.
3) Bestagon B-1530: blocked polyisocyanate manufactured by Degussa
4) Epiclon 4050: solid epoxy resin of a polyglycidyl ether type of bisphenl A manufactured by DAINIPPON INK & CHEMICALS, Inc.
5) Acronal 4F: surface modifier manufactured by BASF in Germany
6) CR-90: rutile type titanium oxide "TIPAQUE CR-90" manufactured by ISHIHARA SANGYO KAISHA, LTD.

Using the resulting powder coatings (P-1) to (P-4) and (p-1) to (p-3), various coating films shown in Table 3 and Table 4 were made according to the following method for forming a coating film, and then the respective coating films were subjected to the coating film performance test.

As the substrate used as a substance to be coated, a zinc-phosphated steel sheet 0.8 mm (thickness)×70 mm×150 mm was used.

A coated article having a coating film made of a powder coating (hereinafter abbreviated to "powder coating film") was obtained by electrostatic powder coating using each of the powder coatings (P-1) to (P-4) and (p-1) to (p-3) so that a film thickness after baking was within a range from 60 to 70 μm and baking was conducted under the conditions of 160° C. for 20 minutes.

With respect to the powder coating film on the coated article thus obtained, performances of the coating film were evaluated. The results are summarized in Table 3 and Table 4.

TABLE 3

| | | Examples | | | |
|---|---|---|---|---|---|
| | Items | 1 | 2 | 3 | 4 |
| | Name of powder coating | P-1 | P-2 | P-3 | P-4 |
| Performances of coating film | Smoothness (appearance of coating film) | ⊚ | ○ | ⊚ | ○ |
| | Impact resistance (cm) | 50< | 50< | 50< | 50< |
| | Boiling water resistance | ⊚ | ⊚ | ○ | ○ |
| | Moisture resistance | ⊚ | ⊚ | ⊚ | ⊚ |
| | Corrosion resistance (mm) | 1–2 | 1> | 2 | 1 |
| | Weatherability (%) | 87 | 95 | 82 | 90 |
| | Storage stability | ○ | ○ | ○ | ○ |

TABLE 4

| | | Comp. Examples | | |
|---|---|---|---|---|
| | Items | 1 | 2 | 3 |
| | Name of powder coating | p-1 | p-2 | p-3 |
| Performances of coating film | Smoothness (appearance of coating film) | ○ | ○ | ○ |
| | Impact resistance (cm) | 20> | 50 | 40 |
| | Boiling water resistance | X | Δ | Δ |
| | Moisture resistance | X | Δ | Δ |
| | Corrosion resistance (mm) | 3 | 4< | 4< |
| | Weatherability (%) | 92 | 55 | 68 |
| | Storage stability | ○ | X | X |

The evaluation was carried out using the following criteria.

Smoothness: Visually evaluated using the following criteria.
⊚: very smooth surface
○: smooth surface, although slight roughness observed
Δ: roughness observed
×: severe roughness observed Impact resistance: Using a Du Pont impact testing device, evaluating a drop height (cm) at which cracking occurs when a punch having a diameter of ½ inch with a weight of 500 g was dropped onto the paint film.

Boiling water test: After a coated sheet was immersed in boiling water and was removed, parallel cut lines (25/25) were formed vertically and horizontally to the surface of the coated sheet using a cutter knife to form squares. An adhesive cellophane tape was then affixed to the cross-cut coating and a peeling test was carried out. The adhesion was evaluated using the following criteria.
⊚: no abnormality observed
○: slight peeling observed
Δ: severe peeling observed
×: whole surface peeled Moisture resistance: After a coated sheet was allowed to stand under conditions of a temperature of 50° C. and a humidity of 98% or more for 500 hours, parallel cut lines (25/25) were formed vertically and horizontally to the surface of the coated sheet using a cutter knife to form squares. An adhesive cellophane tape was then affixed to the cross-cut coating and a peeling test was carried out. The adhesion was evaluated using the following criteria.

⊚: no abnormality observed

○: slight peeling observed

Δ: severe peeling observed

×: whole surface peeled

Corrosion resistance: Parallel cut lines were formed vertically and horizontally to the surface of the coated sheet using a cutter knife to form squares. After carrying out a salt spray test (5% salt water spray, test temperature: 35° C., using a testing device manufactured by Suga Testing Machine Mfg. Co., Ltd.) for 240 hours, an adhesive cellophane tape was then affixed to the cross-cut coating and a peeling test was carried out. Then, the width (one side, mm) of peeling from the cross-cut portion was measured.

Weatherability: Using a sunshine weathermeter (manufactured by Suga Testing Machine Mfg. Co., Ltd.), an accelerated weathering test was carried out for 750 hours and the gloss retention (60° G.R. %) of the coating film was measured.

Storage stability: After a coating was stored in a temperature maintained at 35° C. for 2 weeks, a blocking state of the coating was visually evaluated.

○: no blocking observed

Δ: partial blocking observed

×: some blocking observed

What is claimed is:

1. A resin composition for powder coating, comprising a non-crystalline polyester resin (A) having a carboxyl group, a crystalline polyester polyurethane resin (B), and a curing agent (C) made of a compound having a functional group reactable with the carboxyl group as an essential component.

2. A resin composition for powder coating according to claim 1, wherein isophthalic acid accounts for at least 50 mol % of a polyhydric carboxylic acid unit constituting the non-crystalline polyester resin (A).

3. A resin composition for powder coating according to claim 1, the crystalline polyester polyurethane resin (B) having a crystallization peak temperature of 30 to 150° C.

4. A resin composition for powder coating according to claim 1, wherein a melt viscosity at 180° C. of the crystalline polyester polyurethane resin (B) is 10 Pa·s or less.

5. A resin composition for powder coating according to claim 1, wherein the polyhydric carboxylic acid unit constituting the crystalline polyester polyurethane resin (B) is a straight-chain aliphatic dicarboxylic acid having an even number from 2 to 22 carbon atoms.

6. A resin composition for powder coating according to claim 1, wherein the polyhydric carboxylic acid unit constituting the crystalline polyester polyurethane resin (B) is a straight-chain aliphatic diol having an even number from 2 to 20 carbon atoms.

7. A resin composition for powder coating according to claim 1, wherein the crystalline polyester polyurethane resin (B) has a carboxyl group.

8. A resin composition for powder coating according to claim 7, wherein the crystalline polyester polyurethane resin (B) has an acid value of 10 to 200.

9. A resin composition for powder coating according to claim 1, wherein the compound having a group reactable with a carboxyl group is at least one compound selected from the group consisting of β-hydroxyalkylamide, triglycidyl isocyanurate, epoxy group-containing acrylic resin and epoxy resin.

10. A powder coating comprising the resin composition for powder coating of claim 1 and a surface modifier.

11. A coated article obtained by coating a substrate with the powder coating of claim 10 and curing the coating film by heating.

* * * * *